United States Patent [19]

Nishimura et al.

[11] Patent Number: 4,771,752

[45] Date of Patent: Sep. 20, 1988

[54] CONTROL SYSTEM FOR INTERNAL COMBUSTION ENGINES

[75] Inventors: Yutaka Nishimura; Yoshishige Oyama, both of Katsuta, Japan

[73] Assignee: Hitachi, Ltd., Tokyo, Japan

[21] Appl. No.: 30,432

[22] Filed: Mar. 26, 1987

[30] Foreign Application Priority Data

Mar. 26, 1986 [JP] Japan .................................. 61-65723

[51] Int. Cl.$^4$ ...................... F02D 41/10; F02D 41/12; F02D 43/00
[52] U.S. Cl. .................................. 123/489; 123/399; 123/422; 123/423; 123/492; 123/493
[58] Field of Search ............... 123/489, 492, 493, 399, 123/350, 422, 423

[56] References Cited

U.S. PATENT DOCUMENTS

| | | | |
|---|---|---|---|
| 4,138,979 | 2/1979 | Taplin | 123/489 |
| 4,168,679 | 9/1979 | Ikeura et al. | 123/489 |
| 4,237,830 | 12/1980 | Stivender | 123/493 |
| 4,245,605 | 1/1981 | Rice et al. | 123/492 |
| 4,499,882 | 2/1985 | Saito et al. | 123/492 |
| 4,524,745 | 6/1985 | Tominari et al. | 123/489 |
| 4,552,116 | 11/1985 | Kuroiwa et al. | 123/489 |

FOREIGN PATENT DOCUMENTS 60-8436 1/1985 Japan .................................. 123/399

Primary Examiner—Andrew M. Dolinar
Attorney, Agent, or Firm—Antonelli, Terry & Wands

[57] ABSTRACT

In a control system for an internal combustion engine, in which the amount of fuel is determined on the basis of the depression amount of an accelerator pedal and the amount of air is determined on the basis of the fuel amount, the changing amounts of the fuel and air are corrected by the changing rate of the accelerator pedal depression amount.

16 Claims, 12 Drawing Sheets

BTDC: BEFORE TOP DEAD CENTER

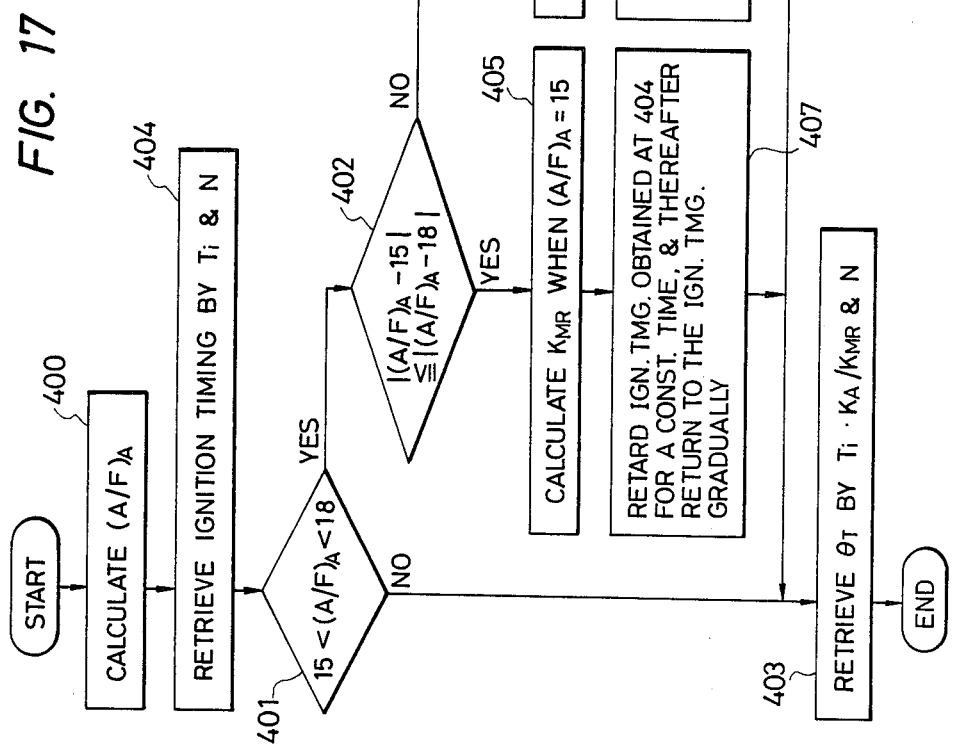

FIG. 18

FROM STEP 280 IN FIG. 5
↓
CALCULATE $\overline{P}_m$ BY FORM. (6) — 500
↓
READ $P_{mr}$ — 501
↓
CALCULATE $K_\theta$ BY FORM. (7) — 502
↓
STORE $K_\theta$ — 503
↓
RETRIEVE $K_\theta$ IN TABLE (FIG. 19) — 504
↓
$\theta_T' = K_\theta \cdot \theta_T$ — 505
↓
TO STEP 290 IN FIG. 5

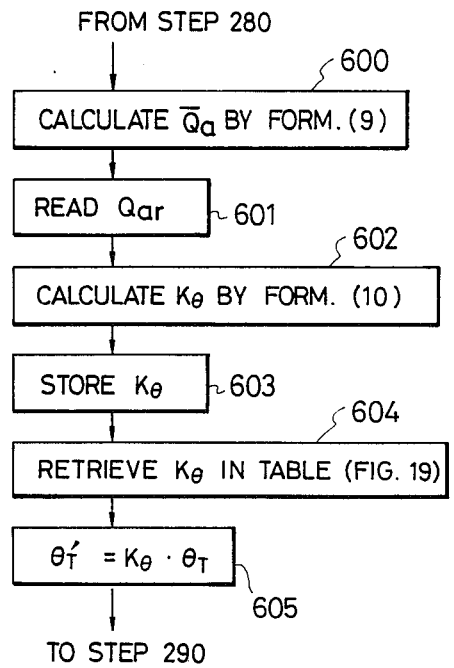

FIG. 20

FROM STEP 280
↓
CALCULATE $\overline{Q}_a$ BY FORM. (9) — 600
↓
READ $Q_{ar}$ — 601
↓
CALCULATE $K_\theta$ BY FORM. (10) — 602
↓
STORE $K_\theta$ — 603
↓
RETRIEVE $K_\theta$ IN TABLE (FIG. 19) — 604
↓
$\theta_T' = K_\theta \cdot \theta_T$ — 605
↓
TO STEP 290

FIG. 19

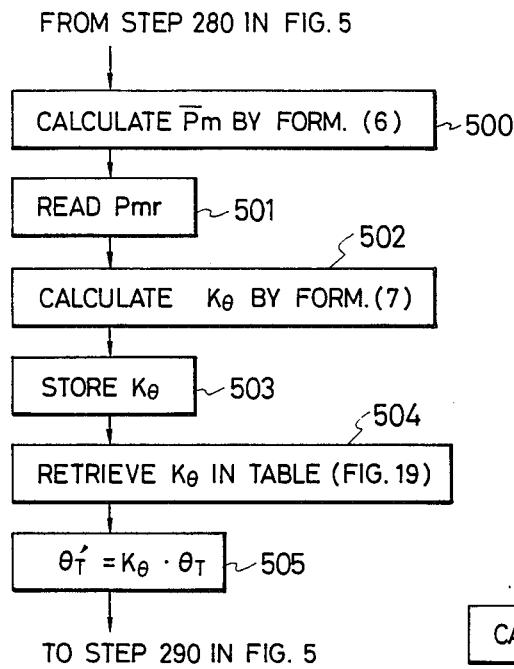

COEFFICIENT $K_\theta$ FOR CORRECTION $T_i$ (vertical axis), with $K_{\theta 11}$ at top-left, $K_{\theta ij}$ in middle, $K_{\theta mn}$ at bottom-right

NUMBER OF REV. OF ENGINE (N)

$\theta_A$ : POSITION OF ACCELERATOR PEDAL (DEPRESSION AMOUNT)

4,771,752

CONTROL SYSTEM FOR INTERNAL COMBUSTION ENGINES

BACKGROUND OF THE INVENTION

1. Field of the Invention

The present invention relates to a control system for an internal combustion engine particularly used in an automobile.

2. Description of the Related Art

An automotive engine is desired to satisfy the demands of reducing the fuel consumption rate and improving the acceleration.

As a method for satisfying these demands, there has been known in the art a system for supplying the internal combustion engine with a lean air/fuel mixture, as disclosed in Japanese Patent Laid-Open No. 59-224499 (1984). However, this method is accompanied by a first problem that a sufficient acceleration cannot be attained because of the leanness of the mixture.

In order to eliminate this shortage of acceleration, on the other hand, it is effective to prepare a rich mixture and supply it to the engine during acceleration. However, there arises a second problem that the engine torque will suddenly change to deteriorate the drivability when the mixture makes a transition from a rich one to a lean one or vice versa.

In order to eliminate this sudden change of the torque, it is conceivable to have a gradual transition of the richness of the mixture. However, there exists between the lean mixture zone and the rich mixture zone the region, i.e. about 15 to 18 in air/fuel ratio, where nitrogen oxides (NO$_X$) are generated at the maximum to adversely affect the reduction of the noxious components in engine exhaust gas.

SUMMARY OF THE INVENTION

It is, therefore, an object of the present invention to provide a control system for an internal combustion engine, which can ensure a sufficient acceleration without affecting the reduction of the noxious components in engine exhaust gas.

The present invention is characterized in that the followability of engine torque is enhanced by controlling the operation of an actuator for driving a throttle valve in accordance with the depression rate of an accelerator pedal.

BRIEF DESCRIPTION OF THE DRAWINGS

FIG. 17 is a flow chart showing a modification of step 280 as shown in FIG. 16;

FIG. 18 is a flow chart of the control, which is added to the main control routine of FIG. 5, in case a suction pressure sensor is used to improve the metering accuracy of the air flow rate;

FIG. 19 is a table of a correction coefficient K$_\theta$ of the opening of the throttle valve;

FIG. 20 is a flow chart showing a modification of that of FIG. 18 in case an air flow sensor is used in place of the suction pressure sensor to improve the metering accuracy of the air flow rate.

DESCRIPTION OF THE PREFERRED EMBODIMENTS

Figure 1:
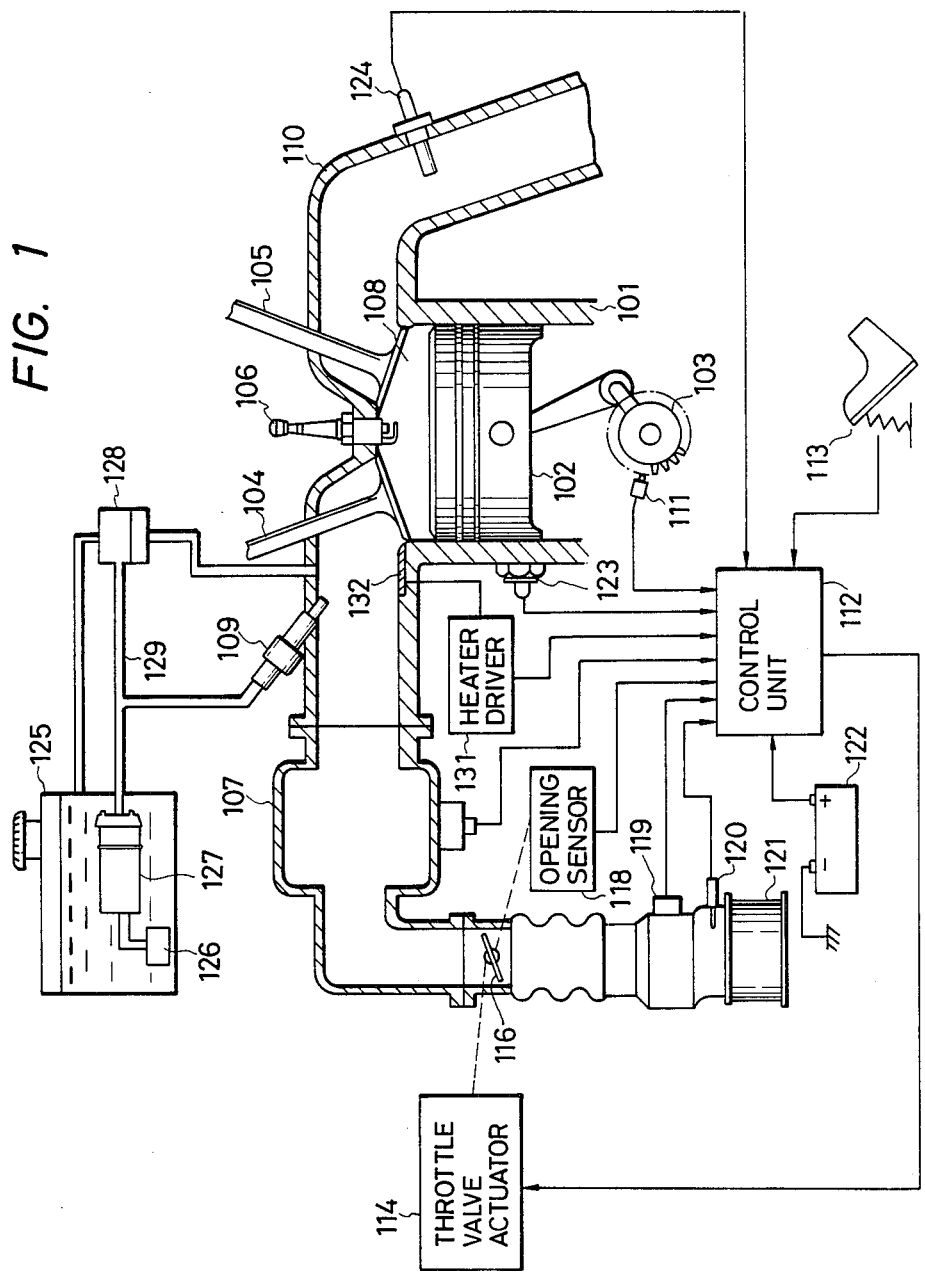
FIG. 1 is a schematic diagram showing an overall construction of a control system according to an embodiment of the present invention.

FIG. 1 is a schematic diagram showing the overall construction of one embodiment of the present invention. Here is shown in section one cylinder of a multicylinder engine. The reciprocal movements of a piston 102 in the cylinder 101 are converted into the revolutions of a crankshaft 103 and outputted as driving power.

In accordance with the movements of the piston 102, on the other hand, an intake valve 104 and an exhaust valve 105 are opened or closed. In synchronism with opening of the intake valve 104, fuel is injected into an intake pipe 107 by an injection valve or injector 109. The fuel thus injected is mixed with the suction air to fill up the inside of the cylinder, i.e., the combustion chamber 108 and is compressed by the piston 102. Then, the air-fuel mixture is ignited by an ignition plug 106. Exhaust gas is discharged into an exhaust pipe 110 when the exhaust valve 105 is opened. There is disposed at the collector portion of an exhaust manifold an air/fuel (A/F) ratio sensor 124 for detecting the ratio of the air to the fuel in the mixture sucked into the engine, in terms of the concentration of excess oxygen contained in the exhaust gas.

Downstream of an air cleaner 121, on the other hand, there are arranged: a suction air temperature sensor 120 (such as a thermocouple or a resistance bulb) for detecting the suction air temperature; an air flow sensor 119 for detecting the flow rate of the suction air; and an opening sensor 118 for detecting the degree of opening of a throttle valve 116. There are also arranged: an accelerator pedal position sensor 113 for detecting the accelerator pedal position; a water temperature sensor 123 for detecting the temperature of the engine cooling water or cylinder wall; and a crank angle sensor 111 for detecting the angle of the crankshaft 103.

All the signals detected by those sensors are inputted to and processed by a control unit 112 having a built-in computer so that signals of the injection valve opening time, the ignition timing and the throttle valve opening are produced and fed to the injector 109, the ignition plug 106 and a throttle valve actuator 114.

The amount $Q_a$ of the air sucked into the engine can be calculated with not only the output signal of the aforementioned air flow sensor 119 but also the output signal of a pressure sensor 115 disposed midway of the intake pipe 107 and the number of revolutions of the engine, i.e., the output signal of the crank angle sensor 111.

In the vicinity of the intake valve 104 of the intake pipe 107, on the other hand, there is buried into an inner wall of the intake pipe 107 a flush-type heating resistor 132 which can have its calorific value controlled from the outside. The current to be applied to the heating resistor 132 is controlled by a heater driver 131. This heater driver 131 is connected with the control unit 112, by which it is controlled in accordance with the respective output signals of the above-specified sensors such that it is fed with much current when the engine is started but has its current flow decreased gradually after the engine has been warmed up. Reference numeral 122 denotes a battery.

Fuel is supplied to the injector 109 from a fuel reservoir 125 by way of a strainer 126, a pump 127, a regulator 128 and a fuel pipe 129 with its pressure controlled at a predetermined value.

Figure 2:
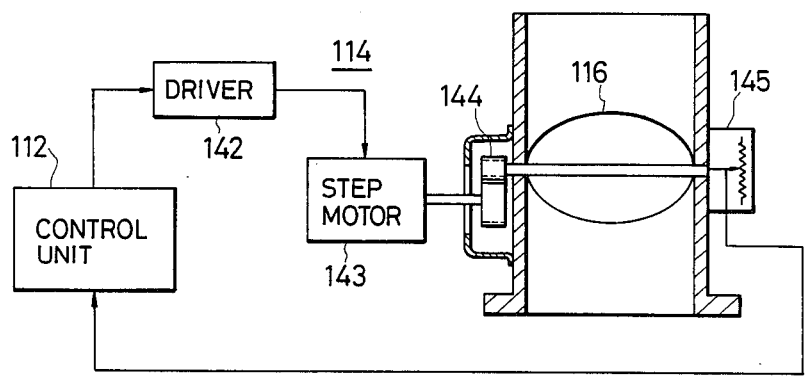
FIG. 2 is a schematic diagram showing a detailed construction of a throttle valve actuator.

FIG. 2 is a diagram showing the detailed construction of the throttle valve actuator 114. A necessary opening of the throttle valve 116 is determined by the arithmetic operation (which will be described hereinafter) of the control unit 112. In accordance with the throttle valve opening determined, a step motor driver 142 generates a signal for determining the direction, angle and velocity of the rotation of a step motor 143. In response to this signal, the step motor 143 is revolved to turn the throttle valve 116 to a predetermined opening through a reduction gear 144.

A potentiometer 145 is provided to measure the actual opening of the throttle valve 116 and is used to make a closed loop control so that the opening may become one determined by the control unit 112. More specifically, the voltage level of the potentiometer 145 is introduced to the control unit 112 when the current to be fed to the step motor 143 is at zero, i.e., when the throttle valve 116 is fully closed, and the throttle valve opening is measured by using that voltage level as a reference. Thus, the dispersion of the resistances and adjustments of the individual potentiometers can be automatically corrected by the control unit 112.

Since, moreover, the step motor 143 is a motor which will turn one step when it receives one pulse, as will be described hereinafter, the throttle valve opening can be determined without the potentiometer 145 if the number of pulses applied to the step motor 143 is integrated from the instant when the current fed to the step motor 143 is at the zero level.

Although not shown, moreover, there is provided a tension return spring which will tense the throttle valve 116 in the closing direction so that the throttle valve 116 is closed by the tensile force of the return spring if the current supply to the step motor 143 is interrupted in an abnormal operation.

Figure 3:
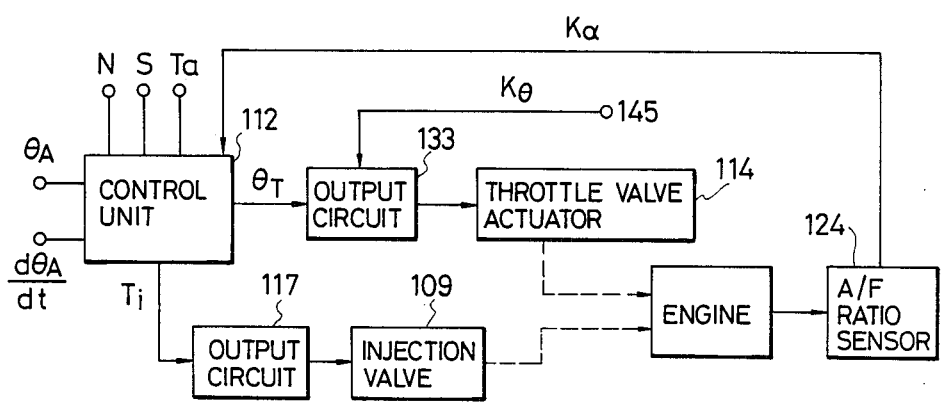
FIG. 3 is a block diagram for explaining the basic concept of the control according to the embodiment of the present invention.

Next, the concept of a control system will be described with reference to the block diagram of FIG. 3. In accordance with an accelerator pedal position signal $\theta_A$, a changing rate signal $d\theta_A/dt$ thereof with respect to time, an engine number-of-revolution signal N and a transmission position signal S, the opening time $T_i$ of the fuel injector 109 is determined by the control unit 112 and is set in an output circuit 117. That opening time $T_i$ is determined by the following formula:

$$T_i = f(\theta_A, d\theta_A/dt, N, S).$$

The opening time $T_i$ is subjected to a feedback control by the signal of the A/F ratio sensor 124, which is denoted by $K_\alpha$.

On the other hand, the throttle valve opening $\theta_T$ is determined by the control unit 112 in accordance with the opening time $T_i$ of the injector 109, the engine number-of-revolution signal N and an air temperature signal $T_A$ and is set in an output circuit 133.

The throttle valve opening $\theta_T$ is determined by the following formula:

$$\theta_T = f(T_i, N, T_a).$$

This throttle valve opening $\theta_T$ is subjected to a feedback control with the signal coming from the potentiometer 145. This feedback signal is denoted by $K_\theta$.

Figure 4:
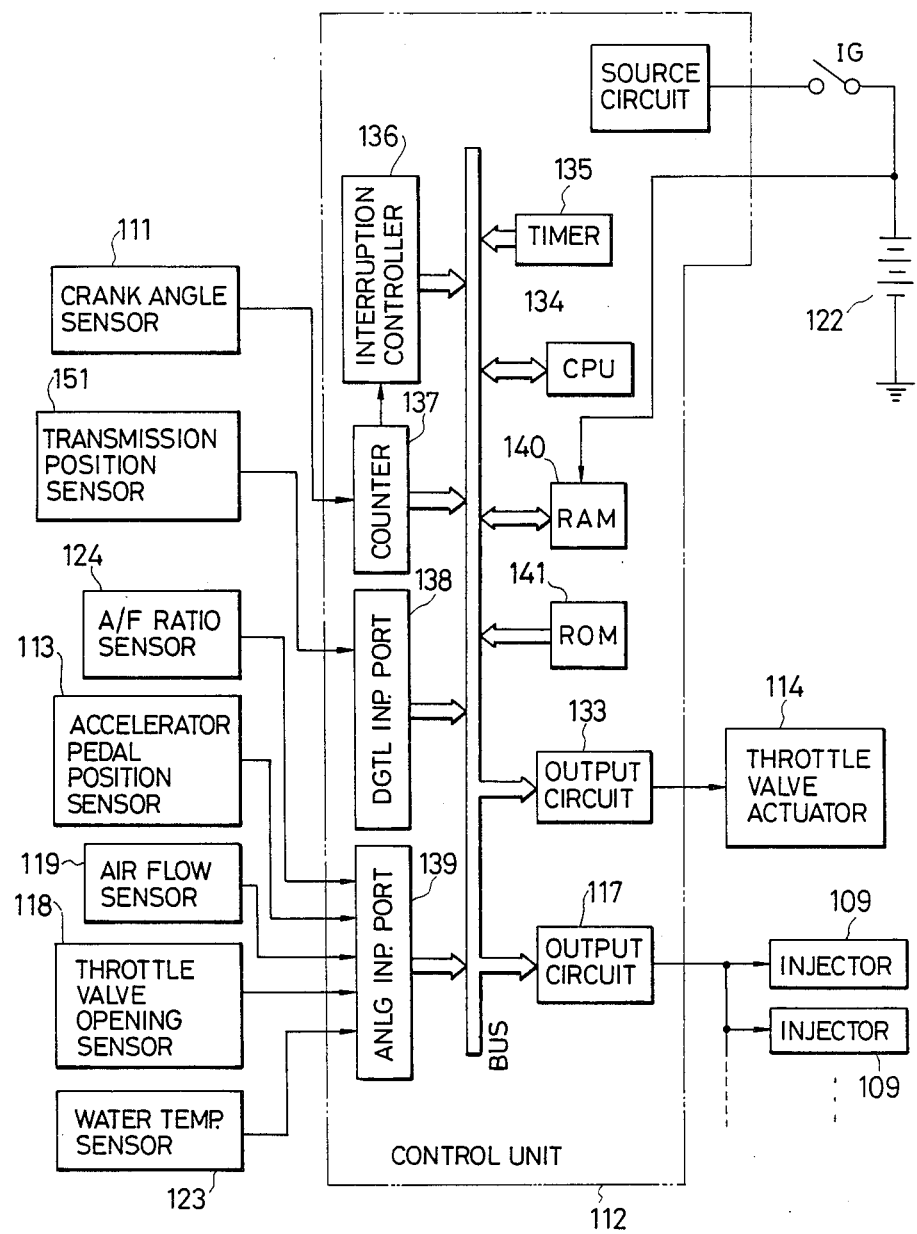
FIG. 4 is a block diagram showing an example of the detailed construction of a control unit used in the control system of the embodiment.

Next, an example of the detailed construction of the control system will be described with reference to FIG. 4.

With a microprocessor (CPU) 134, there is connected through a bus a timer 135, an interruption controller 136, a number-of-revolution counter 137, a digital input port 138, an analog input port 139, a RAM 140, a ROM 141, and the output circuits 117 and 133. The signals of the A/F ratio sensor 124 and the accelerator pedal position sensor 113 are introduced into the analog input port 139. If necessary, the signals of the air flow meter 119, the water temperature sensor 123 and the throttle valve opening sensor 118 are also introduced into the analog input port 139.

The signal of a transmission position sensor 151 is inputted into the digital input port 138. If an ignition switch IG is turned on, the electric power is supplied from the battery 122 to the control unit 112. Incidentally, the RAM 140 is always supplied with the power.

Figure 5:
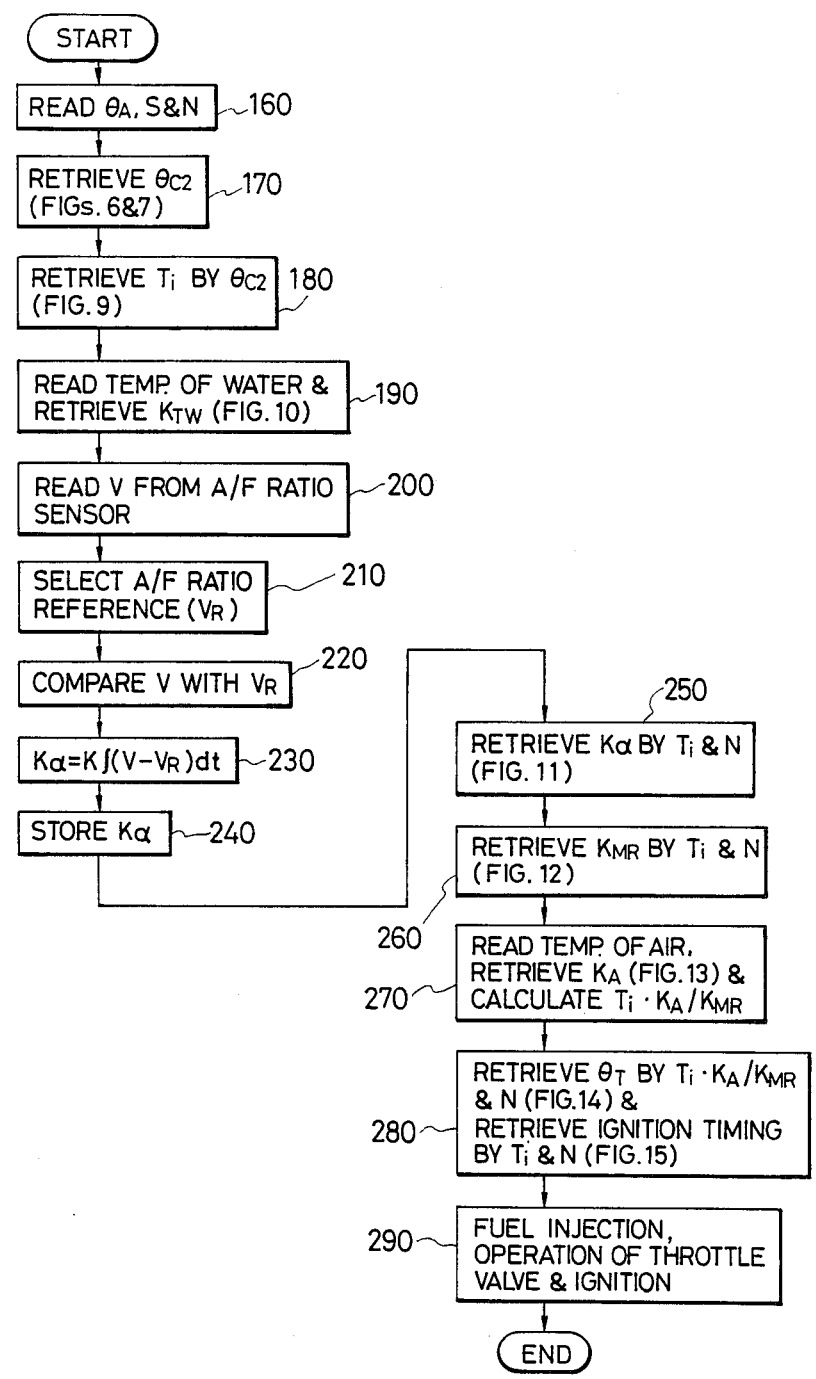
FIG. 5 is a flow chart showing schematically the main routine of the control.

When the ignition switch IG is turned on, the control of the main routine shown in FIG. 5 is started by executing a program which is stored in advance in the ROM 141. The main output signals of the control unit 112 are the signals of the fuel injection valve opening time, the ignition timing, the throttle valve opening and so on.

Next, the content of the main routine of FIG. 5 will be described with reference to FIGS. 6 to 20. If the main routine is started, the initialization is conducted. Then, at step 160, the accelerator pedal position $\theta_A$, the transmission position S and the engine number-of-revolution N are read. At step 170, as a pre-processing of determining the basic amount of fuel injection $T_i$, the corrected accelerator pedal position $\theta_{C2}$ is obtained by retrieving the relation provided therefor in advance on the basis of $\theta_A$.

Figure 6:
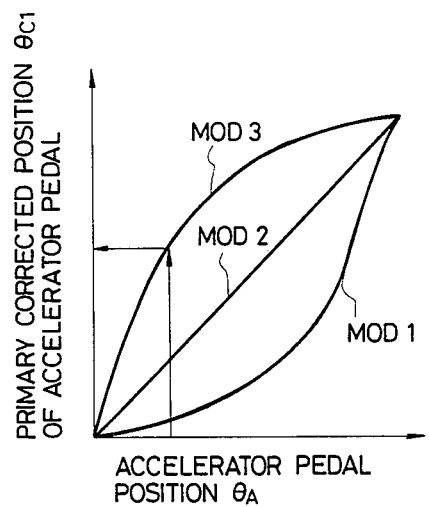
FIGS. 6 and 7 are diagrams showing the relations for obtaining the corrected accelerator pedal position from actual accelerator pedal position signals.
Figure 7:
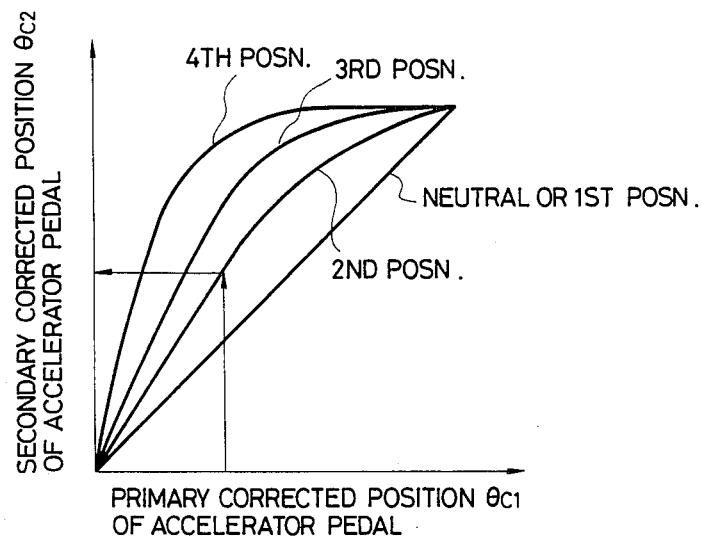

When the driver desires to quickly accelerate or decelerate an automobile, he rapidly depresses or releases an accelerator pedal. The accelerator pedal position signal $\theta_A$ is read into the control unit 112, in which the changing rate $\Delta\theta_A$ (i.e., $d\theta_A/dt$) thereof for a predetermined time (e.g., 40 to 60 ms) is obtained. In accordance with the absolute value $|\Delta\theta_A|$ of the changing rate $\Delta\theta_A$, one of curves MOD1, MOD2 and MOD3 shown in FIG. 6 is selected. For example:

MOD1 for $0 \leq |\Delta\theta_A| \leq C_1$;

MOD2 for $C_1 < |\Delta\theta_A| \leq C_2$; and

MOD3 for $C_2 < |\Delta\theta_A|$.

Wherein $C_1$ and $C_2$ are constants arbitrarily set in accordance with required types of driving, i.e. sporty driving or economic one. Further, $C_1$ and $C_2$ for the sporty driving are selected at smaller values than those for the economic driving.

Subsequently, a primary corrected accelerator pedal position $\theta_{C1}$ is obtained by retrieving the selected one of the three curves on the basis of the actual accelerator pedal position $\theta_A$. By the use of FIG. 7, moreover, the primary corrected position $\theta_{C1}$ is converted into a secondary one $\theta_{C2}$ in accordance with the transmission gear position S.

This is to change the fuel increasing rate with respect to the amount of depression of the accelerator pedal in accordance with the transmission position so that the changing rate (or acceleration) of the automobile speed with respect to the amount of depression of the accelerator pedal may be substantially identical over the low to high transmission gear position of the transmission. More specifically, in case the transmission is in the 4th position, the torque to be transmitted to wheels is lower than that in the case of the 1st position so that the acceleration becomes the lower. In the case of the 4th position, therefore, the increasing rate of the fuel with respect to the accelerator pedal position is enlarged.

Figure 8:
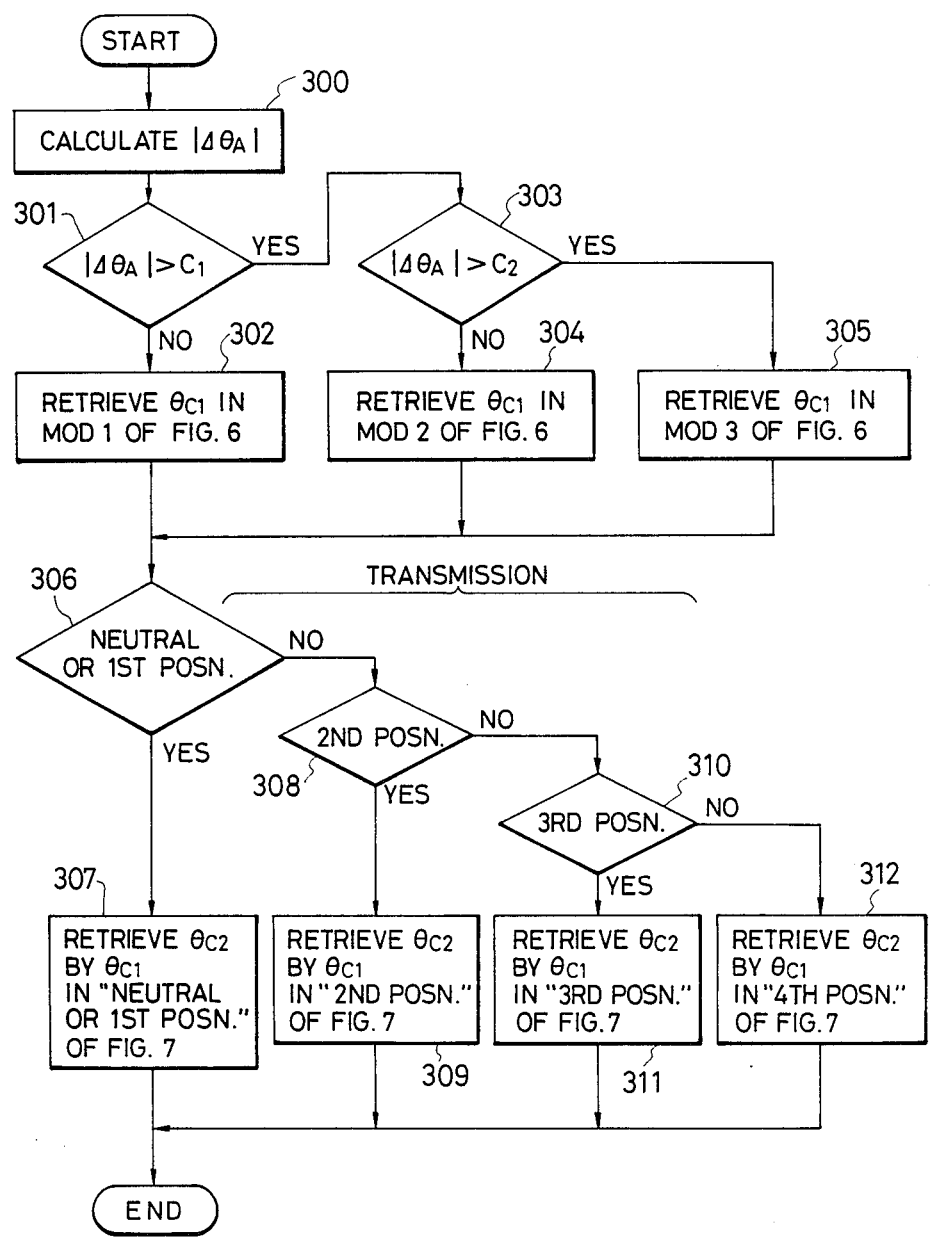
FIG. 8 is a detailed flow chart showing step 170 in the control routine of FIG. 5.
Figure 9:
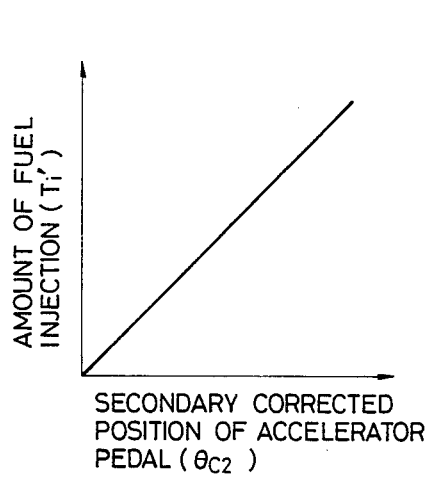
FIG. 9 is a diagram showing the relation between the corrected accelerator pedal position signal and the amount of fuel injection T$_i$.
Figure 10:
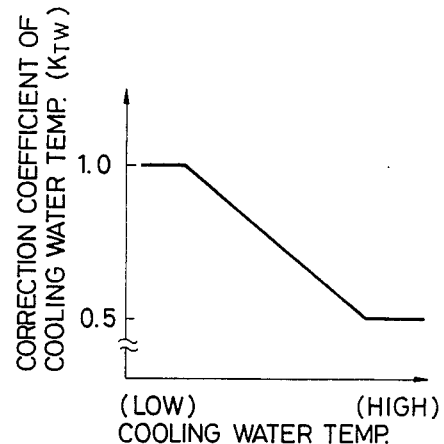
FIG. 10 is a diagram showing the relation between the engine cooling water temperature and its correction coefficient K$_{TW}$.

The detail of the step 170 described above is shown in FIG. 8. In FIG. 8, more specifically, the changing rate of the accelerator pedal position is calculated at step 300. At steps 301 and 303, it is judged which one of the modes MOD1, MOD2 and MOD3 the changing rate is located in. At steps 302, 304 and 305, the primary corrected accelerator pedal position $\theta_{C1}$ is retrieved in accordance with each of the MOD1 to MOD3. Next, at steps 306, 308 and 310, it is judged what the transmission gear position is. At steps 307, 309, 311 and 312, the secondary corrected accelerator pedal position $\theta_{C2}$ is retrieved.

According to this processing of FIG. 8, the accelerator pedal position is corrected on the basis of the MOD1 to MOD3 which are different depending upon the changing rate of the accelerator pedal, the acceleration can be improved whatever the transmission gear position might be.

Reverting to FIG. 5, at step 180, the basic amount of fuel injection $T_i$ is retrieved. Here, the amount of $T_i$ of the fuel to be injected during one suction stroke is retrieved on the basis of secondary corrected accelerator pedal position $\theta_{C2}$ by the use of FIG. 9. Next, at step 190, a correction coefficient is retrieved from the relation between the cooling water temperature and the correction coefficient characteristics shown in FIG. 10.

In the following, the correction of the output of the A/F ratio sensor 124 at and after step 200 will be described.

At step 200, an A/F ratio signal V is read from the A/F ratio sensor 124 disposed in the exhaust pipe 110. Then, at step 210, an A/F ratio reference $V_R$ determined in advance is selected in accordance with the running state. At step 220, the set A/F ratio reference $V_R$ is compared with the A/F ratio signal V. Next, the correction coefficient $K_\alpha$ is calculated at step 230 in accordance with a formula described thereat and is stored in the RAM 140 at step 240. Here, the coefficient $K_\alpha$ is one for integration control.

Figure 11:
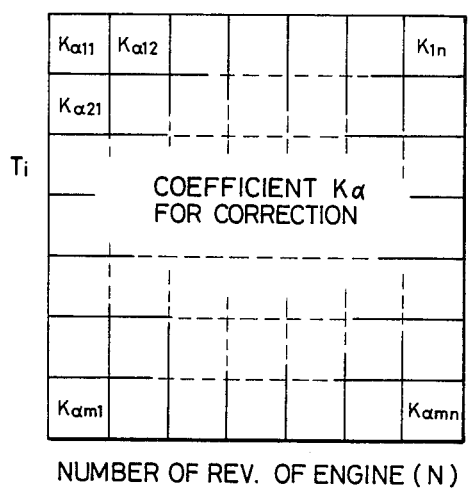
FIG. 11 is a table showing a correction coefficient K$_\alpha$ obtained by an air/fuel ratio sensor.

Incidentally, the RAM 140 has a table of the coefficient $K_\alpha$, in which the number of revolutions of engine N and the basic amount of fuel injection $T_i$ are taken in the abscissa and ordinate, respectively, as shown in FIG. 11. This table is renewed each time a new value of the coefficient $K_\alpha$ is obtained at step 230. As a result, the content of the table is gradually made appropriate by the learning effect. The table thus renewed cannot have its content erased even if the key switch IG of the engine is turned off, because the RAM 140 is always supplied with electric power.

Next, at step 250, the correction coefficient $K_\alpha$ is retrieved on the basis of the basic amount of fuel injection $T_i$ and the number of revolutions of engine N in the table of FIG. 11, and the amount of fuel injection $T_{inj}$ is obtained by the following formula:

$$T_{inj} = T_i \times COEFF \times K_\alpha \qquad (1),$$

wherein the following coefficients are used solely or in combination as the "COEFF":

$K_{AS}$: coefficient for increment of fuel after start;

$K_{AI}$: coefficient for increment of fuel after idle;

$T_{ADD}$: coefficient for acceleration increment; and $K_{DEC}$: correction coefficient of deceleration.

Figure 12:
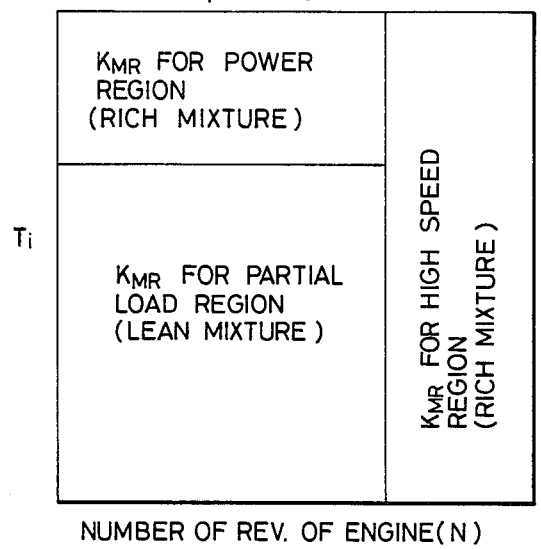
FIG. 12 is a table showing a correction coefficient K$_{MR}$ for setting the air/fuel ratio according to the operational condition of the engine.

Next, at step 260, an A/F ratio correction coefficient $K_{MR}$ is retrieved. FIG. 12 is a table of the correction coefficient $K_{MR}$ for setting the optimum A/F ratio in each operational state of the engine.

The region where the value of the basic amount of fuel injection $T_i$ is high corresponds to the so-called "power region", in which the depression amount of the accelerator pedal is large to provide a rich mixture so as to increase the engine output. For a high speed region, a rich mixture is prepared to prevent the seizure of the engine. In another running region, i.e. a partial load region, on the other hand, a lean mixture is prepared to reduce the fuel consumption rate. The correction coefficient $K_{MR}$ is retrieved from the basic amount of fuel injection $T_i$ and the engine number of revolutions N by the use of the table set above.

Figure 13:
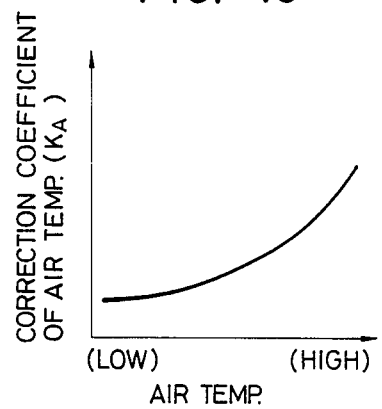
FIG. 13 is a diagram showing the relation between the air temperature upstream of a throttle valve and a correction coefficient K$_A$.
Figure 15:
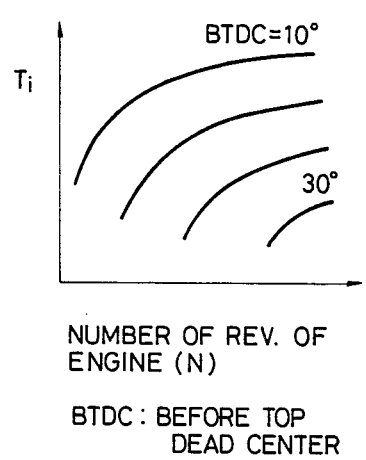
FIG. 15 is a diagram showing the relations for determining an ignition timing BTDC from the amount of fuel injection and the number of revolutions of the engine.

At step 270, the signal of the suction air temperature sensor 120 disposed upstream of the throttle valve 116 is read to retrieve a correction coefficient $K_A$ by the use of the relation shown in FIG. 13 and to calculate the value of $T_i \times K_A/K_{MR}$.

At step 280, the opening of the throttle valve 116 and the ignition timing are retrieved. At first, the opening $\theta_T$ of the throttle valve 116 is retrieved on the basis of the value of $T_i \times K_A/K_{MR}$ and the number of revolutions N of the engine by using the relation of FIG. 14. This relation is so set that the amount of suction air $Q_a/N$ per one suction stroke of the engine satisfies the following formula (2):

$$Q_a/N = K_q \times T_i/K_{MR} \quad (2)$$

wherein $K_q$: a constant.

On the other hand, the amount of fuel injection $Q_f/N$ during the engine suction stroke is expressed by the following formula (3):

$$Q_f/N = K_{10} \times T_{inj} \quad (3)$$

wherein $K_{10}$: a constant.

As a result, the set A/F ratio is expressed from the formulas (2) and (3) by the following formula (4):

$$(A/F)_A = K_{11} \times T_i/(K_{MR} \times T_{inj}) \quad (4)$$

Incidentally, for an A/F ratio range of 15 to 18, the concentration of $NO_X$ as the noxious exhaust component rises to a high value, as is well known in the art. In order to reduce the emission of $NO_X$, therefore, the set A/F ratio has to avoid the range of 15 to 18.

Figure 16:
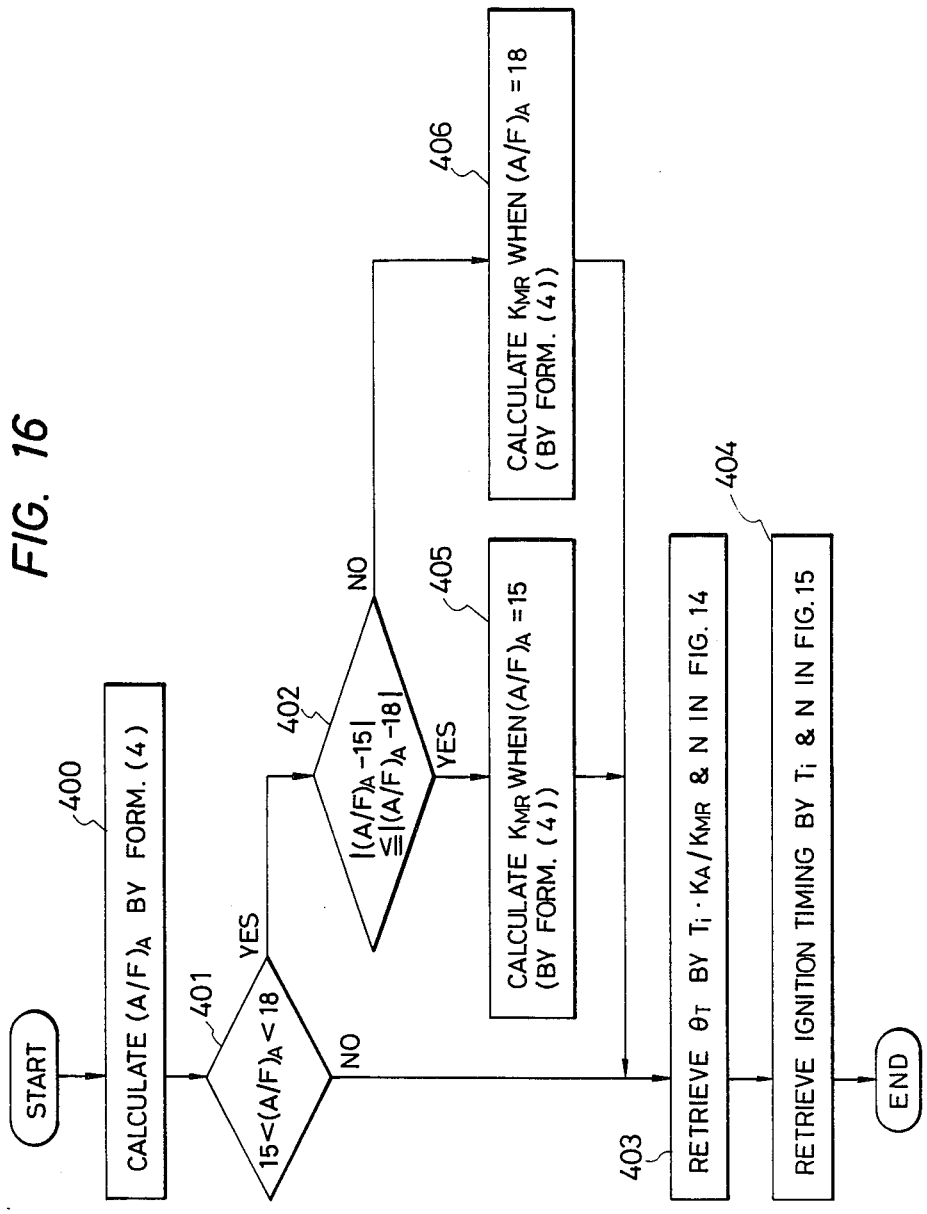
FIG. 16 is a detailed flow chart showing step 280 in the control routine of FIG. 5.

The detail of step 280 is shown in FIG. 16. At step 400, the set A/F ratio $(A/F)_A$ is calculated by the use of formula (4). In case this $(A/F)_A$ is within the range of 15 to 18, namely, in case it is judged at step 401 that $15 < (A/F)_A < 18$, the emission of $NO_X$ increases, as has been described above. At steps 405 and 406, the value $K_{MR}$ is detected for $(A/F)_A = 15$ or $(A/F)_A = 18$ by the use of formula (4) to prepare a rich mixture. More specifically, the amount of air is reduced while the amount of fuel is left as it is, so that the A/F ratio of high $NO_X$ emission may be avoided.

Figure 14:
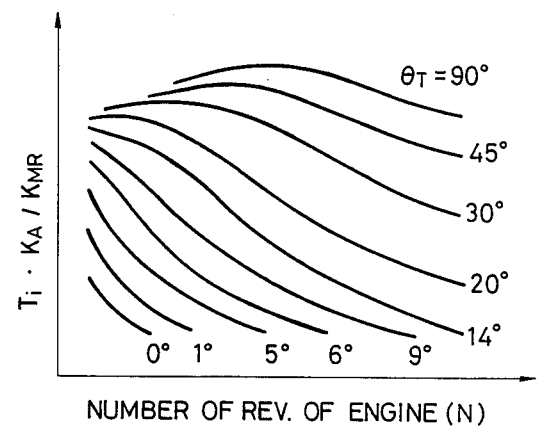
FIG. 14 is a diagram showing the relations for determining the opening of the throttle valve from the ratio of T$_i \times$ K$_A$/K$_{MR}$ and the number of revolutions of the engine.

Then, a new throttle valve opening $\theta_T$ is obtained by the use of the newly retrieved $K_{MR}$ from the value of $T_i \times K_A/K_{MR}$ and the engine number of revolutions N in view of the relations of FIG. 14. Thus, the emission of $NO_X$ can be reduced.

Returning to FIG. 5, at step 290, the opening signal $\theta_T$ of the throttle valve 116 thus obtained is sent to the throttle valve actuator 114. The difference $\Delta\theta_T$ between the set throttle valve opening $\theta_T$ and the present throttle valve opening detected by the potentiometer 145 is obtained to control the throttle valve 116. Incidentally, in case the step motor 143 is used as the throttle valve actuator 114, the number of pulses corresponding to the difference $\Delta\theta_T$ is given to the step motor 143. In case it is necessary to set the throttle valve opening highly accurately, moreover, the actual throttle valve opening is measured by the potentiometer 145 to conduct a closed loop control so that it may be the set throttle valve opening $\theta_T$.

The ignition timing is obtained by an interpolation from the relation between the number of revolutions N of the engine and the basic amount of fuel injection $T_i$, which is shown by using the ignition timing BTDC as a parameter.

Incidentally, the aforementioned relations and tables of FIGS. 6 to 10 and FIGS. 12 to 15 are stored in advance in the ROM 141 of the control unit 112.

Figure 22A:
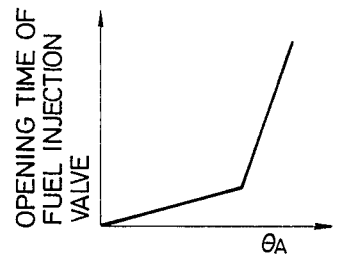
Figure 22B:
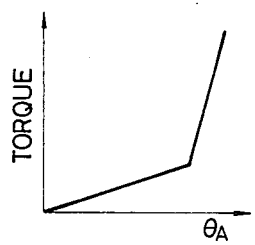
Figure 22C:
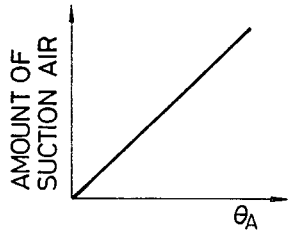

In the lean mixture combustion system of the prior art, the accelerator and the throttle valve are mechanically connected through a link or the like so that the throttle valve has its opening increased monotonously to increase the amount of suction air with the increase in the depression amount $\theta_A$, as shown in FIG. 22c. In the vicinity of the maximum of the depression amount $\theta_A$ of the accelerator pedal, on the other hand, a high engine output is required so that there is nothing for it but to enrich the mixture. As a result, the characteristics of the A/F ratio for the depression amount $\theta_A$ of the accelerator pedal are expressed by the curve shown in FIG. 22d.

Accordingly, the characteristics of the opening time of the fuel injector 109, i.e., the amount of fuel for the depression amount $\theta_A$ of the accelerator pedal are expressed by the curve shown in FIG. 22a, and the engine torque is expressed by the curve shown in FIG. 22b because it is in proportion to the amount of fuel. More specifically, the torque is characterized in that its increment is low for the range of a smaller depression amount $\theta_A$ of the accelerator pedal but suddenly becomes high in the vicinity of the maximum depression amount. With these characteristics, however, the torque is so small as to make the driver feel the shortage of the acceleration in the small range of the depression amount $\theta_A$ of the accelerator pedal.

Figure 22D:
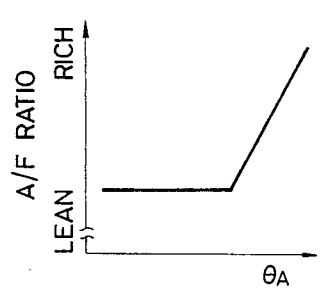

On the other hand, the characteristics of the A/F ratio are expressed by the curve shown in FIG. 22d such that the A/F ratio continuously changes from the lean mixture to the rich mixture in the range of the large depression amount $\theta_A$ of the accelerator pedal. This raises a defect that much $NO_X$ is emitted because the A/F ratio range of 15 to 18 is passed with the increase in the depression amount $\theta_A$ of the accelerator pedal.

Figure 21A:
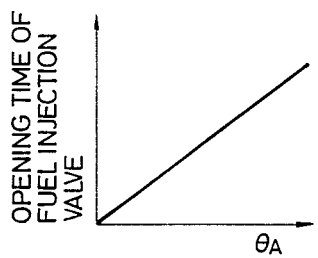
FIGS. 21a–21d and 22a–22d are diagrams for explaining the effects of the present invention in comparison with the example of the prior art.
Figure 21B:
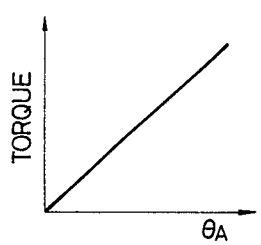

According to the control shown in the flow chart of FIG. 5, on the contrary, the amount of fuel can be characterized to be generally proportional to the depression amount $\theta_A$ of the accelerator pedal, as shown in FIG. 21a. As a result, the control of FIG. 5 can have an advantage that the torque is monotonously increased for the depression amount $\theta_A$ of the accelerator pedal, as shown in FIG. 21b, so that the drive can be smoothed from the small depression amount to the large one of the accelerator pedal.

Figure 21C:
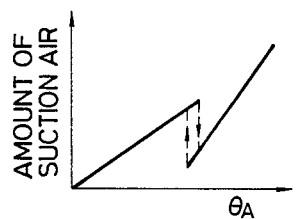
Figure 21D:
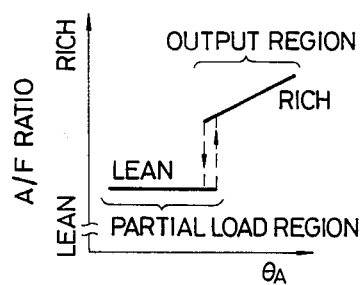

Since, moreover, the amount of suction air to the engine can be freely set by the throttle valve actuator 114, the A/F ratio can be characterized, as shown in FIG. 21d, if the amount of suction air is set as shown in FIG. 21c. As a result, the drive can be made without any increase in $NO_X$ emission from the small depression amount to the large one of the accelerator pedal by skipping over the A/F ratio range of 15 to 18 of much $NO_X$ emission.

In other words, the amount of suction air can be set freely in accordance with the command of the control unit 112 by adopting the throttle valve actuator 114 according to the present invention so that the torque to be produced by the engine and the A/F ratio of the fuel mixture can be controlled independently of each other. As a result, there can be attained an effect that the countermeasures for the exhaust emission can be simplified so that the acceleration performance and the fuel economy can be compatible by making the amount of fuel injection proportional to the depression amount $\theta_A$ of the accelerator pedal.

Incidentally, in case the A/F ratio is controlled to vary at steps 405, 406 and 403 of FIG. 16, the torque fluctuates a little. In this case, however, these torque fluctuations can be suppressed if the ignition timing is corrected at steps 407 and 408, as shown in FIG. 17. More specifically, the torque fluctuations are suppressed by retarding the ignition timing for the lower A/F ratio and advancing it for the higher A/F ratio.

FIG. 18 shows another example in which a correction is made by the intake pressure.

Generally speaking, the amount of air $Q_a/N$ to be sucked into the cylinder for one revolution of the engine is expressed by the following formula (5) if an suction pressure $P_m$ is used:

$$Q_a/N = K_2 \times P_m \times \eta \times K_{AIR} \quad (5)$$

wherein:

$K_2$: a constant;

$\eta$: a suction efficiency; and $K_{AIR}$: a correction coefficient of suction air temperature.

The pressure of suction air $\bar{P}_m$ for giving the amount of suction air for a set A/F ratio is given by the following formula (6) with the basic amount of fuel injection $T_i$ and the correction coefficient $K_{MR}$ of A/F ratio depending upon the engine operational condition:

$$\bar{P}_m = K_3 \times T_i / (\eta \times K_{AIR} \times K_{MR}) \quad (6)$$

wherein $K_3$: a constant.

Therefore, if the opening of the throttle valve 116 is subjected to the closed loop control while the actual suction air pressure is measured by the suction air pressure sensor 115 so that the set suction air pressure of formula (6) may be attained, a highly accurate control of the amount of suction can be realized.

New steps will be described in the following with reference to the flow chart of FIG. 18. At step 500, the set pressure of suction air $\bar{P}_m$ is calculated by the use of formula (6). At step 501, the actual pressure of suction air $P_{mr}$ is read by the use of the suction air pressure sensor 115.

At step 502, the throttle valve opening correction coefficient $K_\theta$ is calculated by the use of the following formula (7) from the set suction air pressure $\bar{P}_m$ calculated at step 500 and the actual suction air pressure $P_{mr}$ and is stored in the RAM 140 of the control unit 112:

$$K_\theta = K_4(\bar{P}_m - P_{mr}) + K_5 \int (\bar{P}_m - P_{mr})dt \quad (7)$$

wherein:

$K_4$: a constant of proportion; and $K_5$: an integration constant.

At step 504, the correction coefficient $K_{74}$ of the throttle valve opening is retrieved in the table shown in FIG. 19. FIG. 19 tabulates the correction coefficient $K_\theta$ for the basic amount of fuel injection $T_i$ retrieved at step 180 (FIG. 5) and the number of revolution N of the engine.

At step 505, a corrected opening $\theta_T'$ is calculated from the following formula (8):

$$\theta_T' = K_\theta \times \theta_T \quad (8),$$

wherein:

$K_\theta$: a correction coefficient of throttle valve opening; and $\theta_T$: a set opening of throttle valve.

FIG. 20 shows a modification of FIG. 18, in which the air flow sensor 119 is used in place of the suction air pressure sensor 115 of FIG. 18. From the basic amount of fuel injection $T_i$ and the correction coefficient of the A/F ratio $K_{MR}$ depending upon the engine operational condition, the amount of suction air $Q_a$ for the set A/F ratio is given by the following formula (9):

$$Q_a = K_6 \times T_i \times N / K_{MR} \quad (9)$$

wherein $K_6$: a constant.

Therefore, the opening of the throttle valve 116 is subjected to a closed loop control while the actual air flow rate being metered by the air flow sensor 119 so that the suction air amount $Q_a$ may be the set one given by formula (9). New steps will be described in the following with reference to the flow chart of FIG. 20.

At step 600, the air flow rate $Q_a$ is calculated by the use of formula (9) from the $T_i$ of step 180 and $K_{MR}$ of step 210. The value thus calculated is designated at $\bar{Q}_a$. At step 601, the actual air flow rate is read by the use of the air flow sensor 119.

At step 602, the throttle valve correction coefficient $K_\theta$ is calculated by the use of the following formula (10) from the set air flow rate $Q_{ar}$. At step 603, the value $K_\theta$ is stored in the RAM 140:

$$K_\theta = K_7(\bar{Q}_a - Q_{ar}) + K_8 \int (\bar{Q}_a - Q_{ar})dt \quad (10)$$

wherein:

$K_7$: a constant of proportion; and $K_8$: an integration constant.

This value $K_\theta$ is similar to that of FIG. 19 and steps 604 and 605 are also similar to the steps 504 and 505.

Although we have herein shown and described only some forms of apparatus embodying our invention, it is understood that various changes and modifications may be made therein within the scope of the appended claims without departing from the spirit and scope of our invention.

What is claimed is:

1. A control system for an internal combustion engine of a vehicle having an accelerator pedal and a transmission, comprising:
   (a) accelerator pedal depression amount detecting means for producing a pedal position signal indicating the depression amount of said accelerator pedal;
   (b) number-of-revolution detection means for detecting the number revolutions of the engine;
   (c) air/fuel ratio detecting means disposed in an exhaust pipe for detecting an air/fuel ratio of fuel mixture from engine exhaust gas;
   (d) accelerator pedal depression changing rate detecting means for producing a rate signal indicating the changing rate of the depression amount of the accelerator pedal;
   (e) fuel injection amount determining means for determining a basic amount of fuel to be injected on the basis of said pedal position signal as corrected in accordance with said rate signal;
   (f) fuel injection amount correcting means for producing a first output signal representing a corrected amount of fuel to be injected by correcting the basic amount of fuel to be injected in accordance with the air/fuel ratio detected by said air/fuel ratio detecting means;
   (g) throttle valve opening determining means for producing a second output signal representing a desired degree of opening of a throttle valve on the basis of said basic amount of fuel to be injected, as corrected in accordance with the temperature of suction air and an operational state of the engine, and the detected number of revolutions of the engine;
   (h) fuel injection means for injecting fuel on the basis of said first output signal from said fuel injection amount correcting means; and (i) throttle valve control means for controlling the throttle valve opening on the basis of said second output signal from said throttle valve opening determining means.

2. A control system according to claim 1, further comprising transmission position detecting means for detecting the operating position of said transmission, said fuel injection amount determining means being responsive to said transmission position detecting means for determining the basic amount of fuel to be injected on the basis of said pedal position signal, said rate signal and said transmission position signal.

3. A control system according to claim 1, wherein said fuel injection amount correcting means further corrects the basic amount of fuel to be injected in accordance with a correction coefficient which is determined by the detected engine number of revolutions and the basic amount of fuel to be injected.

4. A control system according to claim 1, further comprising ignition timing determining means for determining an ignition timing on the basis of the basic amount of fuel to be injected as determined by said fuel injection amount determining means and the detected number of revolutions of the engine.

5. A control system for an internal combustion engine, comprising:
   (a) accelerator pedal detecting means for detecting the depression amount of an accelerator pedal and the rate of movement thereof;
   (b) number-of-revolution detecting means for detecting the number of revolutions of the engine;
   (c) air/fuel ratio detecting means disposed in an exhaust pipe for detecting an air/fuel ratio of fuel mixture from engine exhaust gas;
   (d) fuel injection amount determining means for determining the basic amount of fuel to be injected on the basis of the depression amount and the rate of movement of said accelerator pedal detected by said accelerator pedal detecting means;
   (e) $NO_X$ emission detecting means for producing an output signal indicating that the air/fuel ratio is within a range of 15 to 18;
   (f) throttle valve opening determining means for producing an output signal representing a desired degree of opening of a throttle valve on the basis of the basic amount of fuel to be injected as determined by said fuel injection amount determining means and for causing the throttle valve to close in reponse to the output signal of said $NO_X$ emission detecting means;
   (g) throttle valve control means for controlling the throttle valve opening on the basis of the output signal produced by said throttle valve opening determining means.

6. A control system according to claim 5, further comprising suction air pressure detecting means for detecting the pressure of suction air; suction air pressure discriminating means for producing an output signal indicating whether or not the suction air pressure is at a set level; and throttle valve opening correcting means for correcting the output signal produced by said throttle valve opening determining means on the basis of the output signal produced by said suction air pressure discriminating means.

7. A control system according to claim 5, further comprising air amount detecting means for detecting the amount of suction air; air amount discriminating means for producing an output signal indicating whether or not the suction air amount is at a set value; and throttle valve opening correcting means for correcting the output signal produced by said throttle valve opening determining means on the basis of the output signal produced by said air amount discriminating means.

8. A control system for an internal combustion engine, comprising:
   accelerator pedal position sensor means for producing a signal representing the depression amount of an accelerator pedal;
   crank angle sensor means for detecting the number of revolutions of the engine;
   air/fuel ratio sensor means, disposed in an exhaust pipe, for detecting an air/fuel ratio of a fuel mixture fed to the engine from the exhaust gas thereof;
   fuel injector means for injecting fuel into the engine in accordance with a fuel control signal indicating the amount of fuel to be injected;
   throttle valve actuator means for controlling the degree of opening of a throttle valve in accordance with a suction air control signal indicating the amount of air to be sucked into the engine; and
   control means, including a computer connected to receive output signals of said accelerator pedal position sensor means, crank angle sensor means and air/fuel ratio sensor means, for processing those output signals to produce said fuel control signal and said suction air control signal, the processing of the output signals including at least the steps of:
   producing a signal indicating a changing rate of the depression amount of the accelerator pedal in relation to time;
   correcting the signal indicating the depression amount of the accelerator pedal on the basis of the changing rate thereof;
   retrieving a value indicating a basic amount of the fuel to be injected from a table within a storage of said computer with a corrected value of the depression amount of the accelerator pedal;
   correcting the basic amount of the fuel to be injected on the basis of the detected air/fuel ratio to produce said fuel control signal; and
   retrieving a value representing the amount of the suction air from a table within the storage of the computer on the basis of the fuel control signal and the detected number of revolutions of the engine to produce said suction air control signal.

9. A control system according to claim 8, wherein there is further provided transmission position sensor means for detecting the position of transmission gears, and wherein the depression amount of the accelerator pedal, which is corrected on the basis of the changing rate thereof, is further corrected in response to the detected position of the transmission gears.

10. A control system according to claim 8, wherein correction of the basic amount of the fuel to be injected is carried out by a correction coefficient which is retrieved from said memory on the basis of the detected number of revolution of the engine and the basic amount of the fuel to be injected.

11. A control system according to claim 8, wherein the suction air amount retrieving step further includes a step of detecting whether or not an air/fuel ratio falls into a range in which the concentration of noxious components in the exhaust gas becomes high, and the suction air control signal is set so as to maintain the air/fuel ratio outside said range.

12. A control system according to claim 11, wherein when the detected air/fuel ratio lies within the range of 15 to 18, the suction air control signal is determined on the basis of the air/fuel ratio of either 15 or 18.

13. A control system according to claim 8, wherein an ignition timing is determined on the basis of the basic amount of the fuel to be injected, which is corrected by a temperature of suction air and an operational state required of the engine, and the detected number of revolutions of the engine.

14. A control system according to claim 13, wherein the suction air amount retrieving step further includes a step of detecting whether or not the air/fuel ratio detected by said air/fuel ratio sensor means is within a range of 15 to 18, and the suction air control signal is set so as to maintain the air/fuel ratio outside said range.

15. A control system according to claim 14, wherein when the detected air/fuel ratio lies within the range of 15 to 18, the suction air control signal is determined on the basis of the air/fuel ratio of either 15 or 18.

16. A control system according to claim 14, wherein when the detected air/fuel ratio lies within said range and is close to 15, the suction air control signal is determined on the basis of the air/fuel ratio of 15 and the ignition timing is retarded for a constant time and thereafter returned gradually, whereas when the detected air/fuel ratio lies within said range and is close to 18, the suction air control signal is determined on the basis of the air/fuel ratio of 18 and the ignition timing is advanced for a constant time and thereafter returned gradually.

* * * * *